United States Patent [19]

Chen

[11] Patent Number: 4,772,868
[45] Date of Patent: Sep. 20, 1988

[54] SIGNAL WARNING SYSTEM FOR MOTOR VEHICLE

[76] Inventor: Cheng-Shyang Chen, No. 15-1, Alley 177, Lane 30, Yung-Chi Rd., Sung-Shan District, Taipei, Taiwan

[21] Appl. No.: 78,850

[22] Filed: Jul. 28, 1987

[51] Int. Cl.$^4$ ............................................. B60Q 1/26
[52] U.S. Cl. ........................................ 340/72; 340/71; 340/522
[58] Field of Search .................. 340/72, 71, 64, 66, 340/69, 669, 670, 522; 307/10 LS

[56] References Cited

U.S. PATENT DOCUMENTS 3,790,932  2/1974  Ridpath .................................. 340/71
4,097,842  6/1978  Zalar et al. ............................ 340/71

FOREIGN PATENT DOCUMENTS 0051629  4/1980  Japan ..................................... 340/72

Primary Examiner—Donnie L. Crosland
Attorney, Agent, or Firm—Cushman, Darby & Cushman

[57] ABSTRACT

A signal warning system for use with an automotive vehicle as to the application of the vehicle's deceleration in excess of a predetermined speed sensed by the system, thereby continuously flashing a lamp thereof for warning a following car.

5 Claims, 2 Drawing Sheets

SIGNAL WARNING SYSTEM FOR MOTOR VEHICLE

BACKGROUND OF THE INVENTION

This invention relates to a signal warning system and more particularly to automatic signal warning system capable of producing a signal to warn following vehicles of deceleration in excess of a predetermined rate.

Large numbers of automobiles commonly follow closely behind each other at high rates of speed on today's modern highways and expressways. If one automobile decelerates, brakes or backs up in an unexpected manner, the following cars often collide in a series of rear end chain reaction collisions. These chain reaction collisions result because drivers of the following cars fail to anticipate the decleration, stopping or backing up of an automobile several cars ahead in the line. By the time a first car immediately ahead of a second automobile begins to decelerate, the driver of a third car does not have insufficient time in which to react and stop his vehicle. Consequently, it is not unusual for a large number of cars to be involved in a series of rear end collisions which results in serious personal injuries and extensive property damage.

To employ warning systems on the rear of automobiles is the most common form of prior art used to solve the problem described above. The warning system lights warn a following driver that the car immediately ahead is slowing down or braking. However, the warning signal of a car further ahead is obscured by the cars immediately ahead of a following car and can not warn a following driver of a sudden slowdown or stop in the line of cars further ahead. Also, the signals of the warning systems are energized by the slightest pressure on a brake pedal. An over-reaction to the signal by following drivers results in an unnecessary amount of sudden breaking which lessens the effectiveness of the warning system as a warning of rapid deceleration. The effectiveness of the signal warning systen is still further reduced since the location and size of the light vary greatly from vehicle to vehicle, and oftentimes a tail light is used as well as a brake light.

SUMMARY OF THE INVENTION

Therefore, it is the main object of this invention to provide an improved signal warning system which is readily visible for warning cars several positions behind a vehicle that the vehicle is rapidly, decelerating, braking or backing up.

Another object of this invention is to provide a simple, easily operated signal warning system which is actuated by deceleration in excess of a predetermined rate without incurring false signalling.

A further object of this invention is to provide a warning signal system which is employed by a driver when stopped along a highway and when entering heavy or high speed traffic.

BRIEF DESCRIPTION OF THE DRAWINGS

These and other objects of this invention will be come readily apparent from the following detailed description of embodiments thereof and the accompanying drawings, in which.

DETAILED DESCRIPTION OF THE INVENTION

Figure 1:
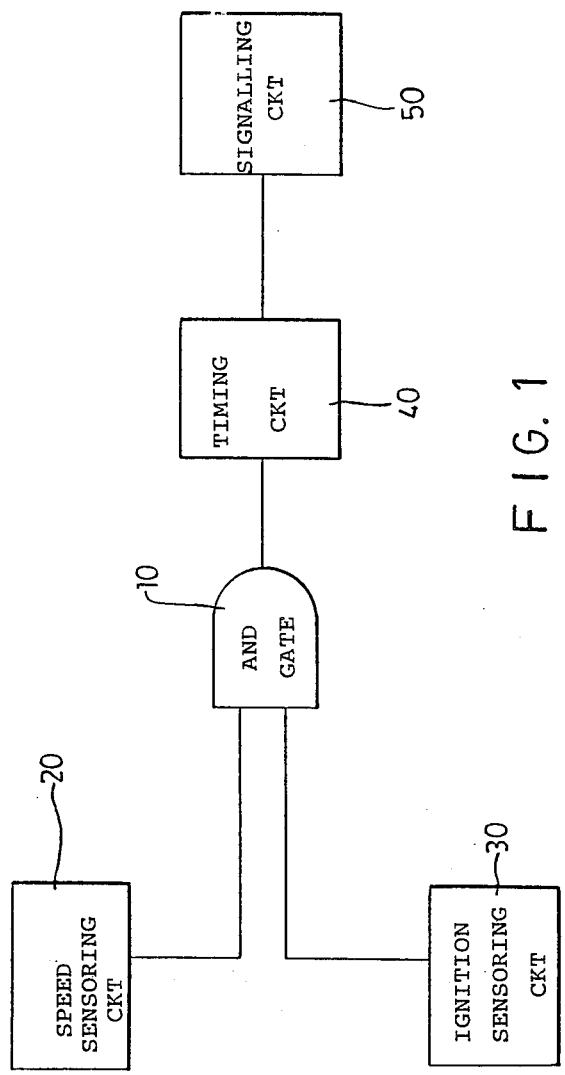
FIG. 1 is a block diagram illustrating the warning signal system of basic forms of this invention.

Referring to FIG. 1, a basic conceptual model of the fundamental functional element of preferred embodiments of this invention is shown, which illustrates: a speed sensing circuit 20 and an ignition sensing circuit 30 are respectively connected to the two input terminals of AND gate 10, while the output terminal of AND gate 10 is coupled to a timing circuit 40. A cable (not shown) connected to a speedometer is supplied to the speed sensing circuit 20. A signaling circuit 50 is coupled to the output terminal of timing circuit 40, thereby causing the lamp thereof to flash.

Figure 2:
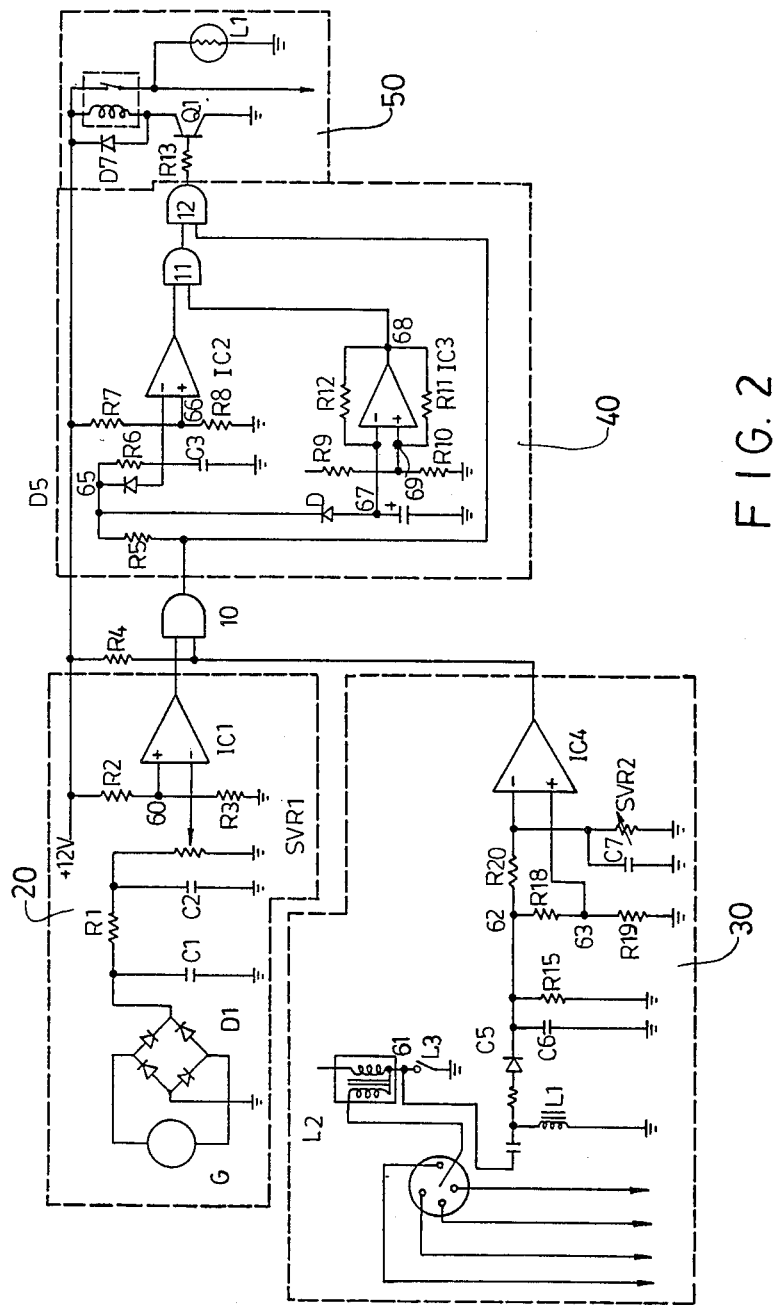
FIG. 2 is a schematic circuit diagram of a preferred embodiment of this invention.

In FIG. 2, the speed sensing circuit 20 includes a comparator IC1, a variable resistor SVR1, a capacitor and a rectifier. The comparator IC1 operates as a voltage comparator. It compares the voltage signal from the negative terminal thereof, which generates with a variable resistor SVR1, with the reference signal from the positive terminal thereof. When the voltage signal from the negative terminal of the comparator IC1 corresponds with the reference signal from the positive terminal thereof, the comparator IC1 outputs a low state signal at the output terminal thereof. Oppositely, if the two voltage signals do not correspond, the comparator IC1 outputs a high state signal.

The alternating current output from the generator G is supplied to a rectifier. The rectifier is simultaneously oriented to one side of capacitor C1 and one terminal of resistor R1. One side of capacitor C2 and one terminal of variable resistor SVR1 are commoned together to the other terminal of resistor R1. The variable resistor SVR1 is connected to the negative terminal of comparator IC1 for adjusting and setting the predetermined value. A resistor R2 and a resistor R3 are connected in series between the positive source and the ground potential. The intermediate node 60 is coupled to the positive terminal of comparator IC1 in order to provide a fixed reference voltage thereat.

In the ignition sensing circuit 30 there is a node 61 between the ignition coil L2 and the breaker point L3, which is coupled through capacitor C5, resistor R14, diode and resistor R20 to the positive terminal of the comparator IC4. A resistor R18 and a resistor R19 are coupled in series between node 62 and the ground potential. A intermediate node 63 is connected to the negative terminal of comparator IC4. A capacitor C7 and a variable resistor SVR2 is coupled together to the positive terminal of comparator IC4. Variable resistor SVR2 is used to allow capacitor C7 to slowly discharge therethrough. Comparator IC4 functions to compare the voltage at positive terminal to the voltage at negative terminal. If the voltage at positive terminal exceeds the voltage at negative terminal then there are high state signals outputted from comparator IC4. If the voltage at positive terminal is less than the voltage at negative terminal then there are low state signals outputted from comparator IC4.

The AND gate 10 whose two input terminals respectively connected to the output terminals of speed sensoring circuit 20 and ignition sensoring circuit 30 is provided, while the output terminal thereof is coupled to node 64.

The timing circuit 40 is used as a timer as well as an oscillator.

A resistor R5 interconnects node 64 and node 65. A resistor R6 and a capacitor C3 are connected in series between node 65 and the ground potential. A diode D5 is reservely coupled between node 65 and the negative terminal of comparator IC2. A resistor R7 interconects the positive source and the positive terminal of comparator IC2. A series of resistors R7 and R8 are connected between the positive source and the ground potential. A intermediate node 66 is coupled to the positive terminal of comparator IC2.

The comparator IC2 which functions as a timer, outputs a train of pulses whose each duration approximately around 1.1 seconds in high and low states thereunder when it is enabled. A diode D16 is reservely provided between nodes 67 and 65. A capacitor is connected between node 67 and the ground potential. A series of resistors R9 and R10 interconnect the positive source and the ground potential and a intermediate node 68 is coupled to the positive terminal of comparator IC3. A resistor R12 is provided between nodes 66 and 68. A resistor R11 is coupled between nodes 67 and 68.

The comparator IC3 which functions as an oscillator, outputs a train of pulses, each having a duration of approximately 0.23 seconds in high and low states thereunder when it is activated.

Two input terminals of AND gate 11 are respectively connected to the output terminals of comparator IC2 and IC3, while the output terminal of AND gate 11 is supplied to one of the input terminals of AND gate 12. The AND gate 12 whose two input terminals respectively supplied to node 64 and the output terminal of AND gate 11 is provided, while the output terminal of which is coupled to a transistor Q1 via resistor R13.

A relay Ry interconnects the positive source, a light L1 and the transistor Q1 whose collector terminal being coupled. A diode D7 whose cathode terminal and anode terminal respectively connected to the positive source and the collector terminal of transistor Q1, is provided in parallel with the relay Ry. Lead A of the relay Ry can be coupled to a brake light, a tail light or a indicating light.

The operation of signal warning system will now be fully described. While a car is being driven at a predetermined speed (i.e., 60 km/hour), the speed sensing circuit 20 and the ignition sensoring circuit 30 are normally kept on high and low state at the output terminals thereof, respectively. If a speed below 60 km/hour caused by the deceleration is being sensed, the ignition sensoring circuit 30 is, accordingly, of high state at the output terminal thereof, but the speed sensing circuit 20 is changed into low state at the output terminal thereof so that the timing circuit 40 is not activated to cause the light L1 to be dimmed.

As the signal is of high state at the output terminal of comparator IC1 caused by that the speed above 60 km/hour is being sensed, and the brake pedal is depressed, the signal supplied from the output terminal of comparator IC4 is of high state to enable the timing circuit 40 and results in activating of the transistor Q1 and affecting of the relay Ry, thereby causing the light L1 to be continuously flashed.

In compliance with the statue, the invention has been described in language more or less specific as to structural features. It is to be understood, however, that the invention is not limited to the specific features shown, since the circuits herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A signal warning system for motor vehicles comprising:
    a gate means having a plurality of input leads and an output lead;
    a speed sensoring means coupled to an input lead of the gate means for sensoring a speed rate of a motor vehicle;
    an ignition sensoring means coupled to another input lead of the gate means for sensoring an ignition rate of the motor vehicle;
    a timing means having an input lead coupled to the output lead of the gate means for receiving signals from the gate means; and
    a warning means having a light disposed therein coupled to the output lead of the timing means for receiving signals from the timing means; whereby said signal warning system can contiunously flash for warning a following car.

2. The signal warning system of claim 1 wherein said gate means is an AND gate.

3. The signal warning system of claim 1 wherein said speed sensoring means includes a setting means disposed therein for setting a predetermined speed rate.

4. The signal warning system of claim 1 wherein said warning means can be electrically connected with a tail light, an indicator light or a brake light of the motor vehicle.

5. The signal warning system of claim 3 wherein said setting means is a variable resistor.

* * * * *